United States Patent [19]

Cicenas

[11] 4,407,526
[45] Oct. 4, 1983

[54] TAB-TYPE COUPLING AND METHOD

[75] Inventor: Christopher W. Cicenas, Madison, Ohio

[73] Assignee: Perfection Corporation, Madison, Ohio

[21] Appl. No.: 222,346

[22] Filed: Jan. 5, 1981

[51] Int. Cl.³ .............................................. F16L 47/00
[52] U.S. Cl. ...................... 285/27; 285/105; 285/242; 285/323; 29/450; 29/464
[58] Field of Search ................. 285/105, 323, 322, 27, 285/24, 104, 243, 249; 29/450, 464

[56] References Cited

U.S. PATENT DOCUMENTS

| | | | |
|---|---|---|---|
| 3,168,779 | 2/1965 | Schustack | 29/450 |
| 3,282,610 | 11/1966 | White | 29/450 X |
| 3,327,379 | 6/1967 | Clements | 29/450 |
| 3,907,335 | 9/1975 | Burge et al. | 285/27 X |
| 3,999,783 | 12/1976 | Legris | 285/24 |
| 4,229,025 | 10/1980 | Volgstadt et al. | 285/323 X |

Primary Examiner—Thomas F. Callaghan
Attorney, Agent, or Firm—Fay & Sharpe

[57] ABSTRACT

A stab-type coupling and method for connecting an end portion of a smooth wall non-metallic pipe or tube to fittings or other pipes or tubes. The coupling is defined by a non-metallic coupling body, a generally elongated hollow insert, an annular retaining spacer ring, seal rings, a collet back-up ring, and a retaining collet all disposed within the recess of the coupling body. The retaining collet is provided with a tapered external surface complementary to an internal frusto-conical surface defined by the back-up ring which in the preferred embodiment is molded within the coupling body. A separate non-metallic chamfer ring which is closely slidably receivable on the hollow insert is also provided. The coupling is made up as by inserting the chamfer ring onto the hollow insert to a position spaced inwardly from the insert outer end and outwardly adjacent to the coupling body. The end of a smooth wall pipe is then urged onto the insert outer end in a surrounding relationship therewith so that the end face of the pipe engages the chamfer ring. Thereafter, the pipe is urged further onto the insert so as to penetrate into the interior of the coupling body. The chamfer ring acts as a guide for the pipe to ease such urging. The retaining collet includes a toothed inner surface which retainingly engages the external surface of the pipe and prevents withdrawal of the pipe from the coupling body. The retaining spacer ring is spaced axially inward in the coupling body from the retaining collet and includes gripping means to aid in pipe retention.

21 Claims, 6 Drawing Figures

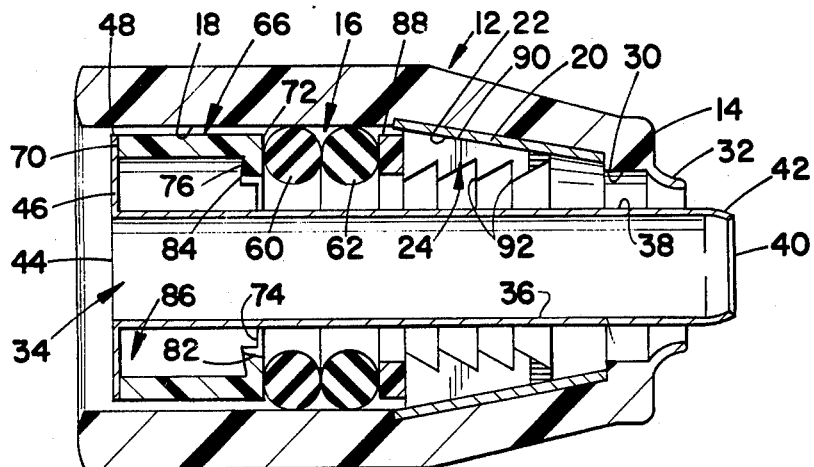
FIG.1
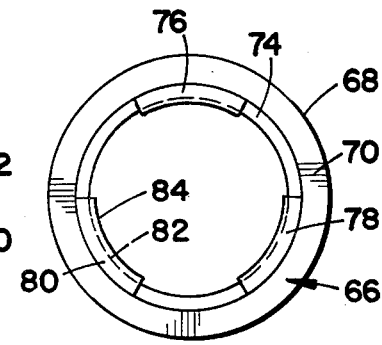
FIG.2
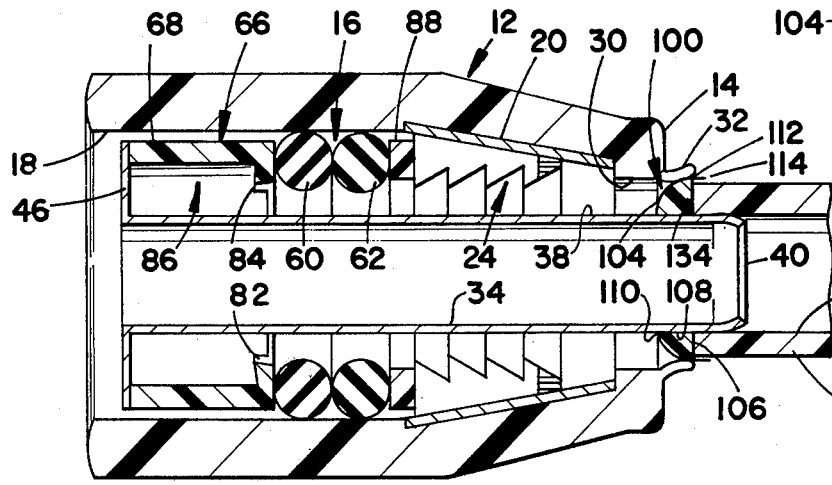
FIG.5
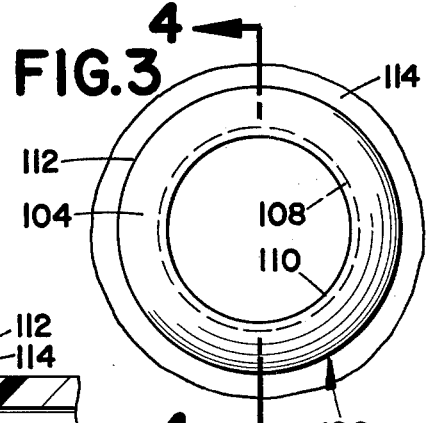
FIG.3
FIG.4
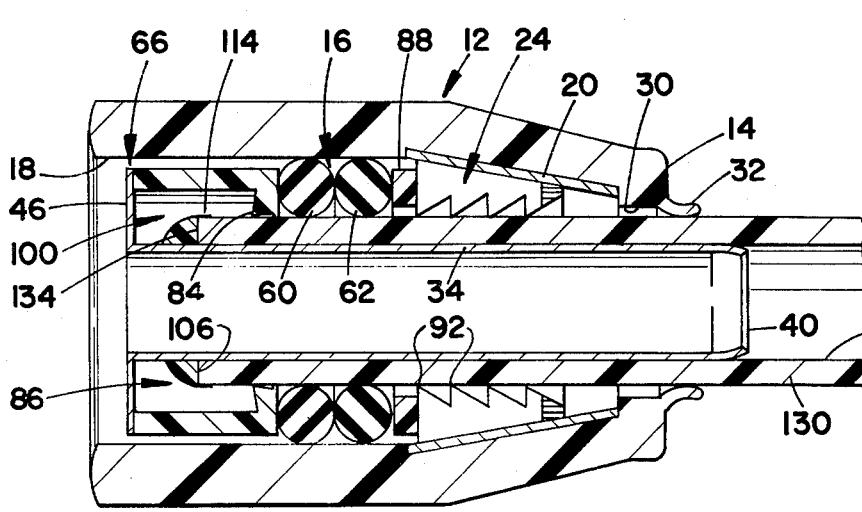
FIG.6

TAB-TYPE COUPLING AND METHOD

BACKGROUND OF THE INVENTION

This invention relates to stab-type couplings or couplings in which assembly of a smooth wall tube to a coupling body is accomplished by pushing or thrusting the tube into the coupling body. Gripping of the tube surface and the resistance to attempted withdrawal is based on the "Chinese finger" principle. A segmented retaining collet cooperates with the tube such that the greater the pull-out force the more securely the tube becomes seated within the coupling. The subject invention provides an improvement for the commonly assigned U.S. Pat. No. 4,229,025 assigned to Perfection Corporation, the teachings of which are incorporated hereinto by reference.

Stab-type couplings have been known to the prior art for a considerable period of time. Generally, such couplings are relatively easy to install and merely require severing the end of the tube at right angles and chamfering the tube end to facilitate insertion of the tube into the coupling body.

One problem encountered in using the prior art stab-type couplings resides in the fact that field installers do not always properly chamfer the tube end or simply disregard the chamfering step altogether. Insertion of the pipe into the coupling under these conditions can be very difficult, particularly when close tolerances of the coupling components are involved. Further problems are encountered when the coupling includes a close fitting protective or moisture seal surrounding the coupling body entry area. Such a cover is used in the preferred structure disclosed in commonly assigned U.S. Pat. No. 4,229,025. A further problem encountered in installing prior art couplings has been in the need for separate or special tool for chamfering the pipe ends.

Due to the foregoing problems, it has been considered desirable to provide a stab-type coupling which would facilitate ease of pipe installation without the necessity for performing any separate or special preliminary pipe chamfering operation. The subject invention meets these needs in a simple and reliable manner.

BRIEF SUMMARY OF THE INVENTION

Generally, the present invention provides an improvement for stab-type couplings which permits ease of interconnection between the couplings and the end portions of associated pipes or tubes.

In accordance with the preferred arrangement, the invention is particularly suited for use with a stab-type coupling including a coupling body having a first end and an internal recess adapted to receive the end portion of a smooth wall pipe. The body first end is provided with a protective or moisture seal adapted to surround the pipe in a slight interference fit when the pipe is inserted into the body. A generally elongated hollow insert is disposed within the recess of the coupling body with one or more seal means and pipe gripping means disposed in the body recess in a spaced surrounding relationship with the elongated insert. The pipe is adapted to be pushed over the insert as the pipe is installed in the coupling body with the seal means and gripping means in cooperative engagement with the pipe outer surface. The subject invention contemplates the provision of a chamfer ring component to render the process of pipe insertion much easier. This chamfer ring is dimensioned for close sliding receipt on the insert forwardly of and in response to insertion of the pipe. The outside diameter of the chamfer ring is generally compatible with the pipe outside diameter and the ring includes forward and rear faces. The forward face tapers toward the rear face generally over the radial extent thereof from the inside diameter to the outside diameter. During pipe insertion, the inner end face of the pipe engages the chamfer ring rear face. The chamfer ring forward face acts as a lead surface for the pipe to gradually spread the protective or moisture seal by an appropriate amount to accommodate easy passage of the pipe therepassed. In addition, the forward face acts as a guide for the pipe through those coupling components disposed in the coupling body recess. With particular reference to the O-ring seals disposed within the coupling body the chamfer ring permits the tube to slip past the O-ring seals with minimum distortion of the seals.

The chamfer ring may also include a flexible generally radial flange at the ring outer diameter. During the course of pipe insertion through at least the protective or moisture seal, this flange is bent rearwardly and covers the area of interface between the pipe inner end face and chamfer ring rear face.

In one preferred type of coupling construction for which the chamfer ring may be used, a spacer ring is disposed in the coupling body recess adjacent the innermost end of the elongated insert. This spacer ring is axially dimensioned to receive the chamfer ring in a manner which will not interfere with the desirable relationships between the other internal coupling components. One such component comprises gripping means generally associated with the rearward end of the spacer ring.

According to another aspect of the invention, a method of assembly for a pipe or tube into a stab-type coupling is advantageously provided.

The principal object of the invention is the provision of a new and improved stab-type coupling arrangement and method which facilitate ease of pipe installation in the coupling.

Another object resides in the provision of such an arrangement and method which are simple, reliable and require no special tools.

Still another object of the invention resides in the versatility of application to a range of stab-coupling designs.

Other objects and advantages will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in the specification and illustrated in the accompanying drawings which form a part hereof and wherein:

FIG. 1 is a longitudinal cross-sectional view of a preferred coupling construction with which the subject invention may be used;

FIG. 2 is a front view of the spacer ring used in the coupling of FIG. 1;

FIG. 3 is a rear end view of the chamfer ring shown in FIG. 4;

FIG. 4 is a cross-sectional view taken on line 4—4 of FIG. 3 and showing the preferred chamfer ring used in the subject invention;

FIG. 5 is a longitudinal cross-sectional view of the coupling of FIG. 1 with the pipe and chamfer ring in position on the coupling insert; and, FIG. 6 is a view similar to FIG. 5 showing the pipe and chamfer ring moved to a fully inserted position in the coupling body.

DESCRIPTION OF THE PREFERRED EMBODIMENT

Referring now to the drawings wherein the showings are for purposes of illustrating the preferred arrangement of the subject invention and not for purposes of limiting same, FIG. 1 shows the general type of stab-type coupling for which the subject invention is particularly adapted for use. This general type of coupling is shown in the commonly assigned U.S. Pat. No. 4,229,025, the teachings of which are incorporated hereinto by reference. It should be appreciated that the coupling body may take several different forms and that the structure of FIG. 1 depicts only that portion of the coupling body which cooperates with the pipe or tube for purposes of forming an interconnection or joint therewith.

More particularly and with continued reference to FIG. 1, the coupling includes a non-metallic coupling body 12 having a first end 14 and an internal recess 16 which is adapted to receive the end portion of a smooth wall non-metallic pipe or tube in a manner to be described. Coupling body 12 defines an internal generally cylindrical surface 18. In the preferred embodiment, a generally frusto-conical metallic back-up ring 20 is molded into coupling body 12 and defines an internal generally frusto-conical surface 22 adapted to cooperate with a retaining collar 24 in a manner to be described more fully below. In alternate embodiments the ring 20 may be eliminated altogether or a plastic ring may be used in lieu of a metal ring.

Adjacent first end 14 of coupling body 12 there is defined a generally cylindrical internal surface or passage 30 adapted to closely surround the external surface of a tube when it is inserted into the coupling body. Molded integrally with coupling body 12 in the preferred embodiment shown is a generally axially outward extending flexible flange or lip 32 which defines a dirt and moisture cover. The function of this cover is to prohibit altogether or at least retard the entry of dirt and moisture into the interior of coupling body 12. It should be noted that the relationship between cover 32 and an associated tube is such that the cover will sealingly engage the tube external surface through a slight interference fit.

In the preferred embodiment, coupling body 12 is injection molded from polyethylene or other suitable plastic. Back-up ring 20 is fabricated from type 316 stainless steel and is insert molded into body 12.

Disposed within the recess of body 12 and approximately concentric with the axis thereof is a steel reinforcing stiffener or hollow insert 34. A generally cylindrical internal passageway 36 is defined within stiffener 34 for the purpose of permitting the passage of fluid therethrough. The external surface 38 of stiffener 34 is dimensioned for receipt within the interior of the end portion of an associated tube. External surface 38 may either be adapted for a close sealing relationship with the internal surface of the tube or, alternately, may be adapted for a loose fitting relationship therein. As shown external surface 38 of insert 34 is generally smooth, although it may also be provided with a plurality of teeth.

First or outer end 40 of stiffener 34 includes a chamfer 42 to facilitate the entry of the stiffener 34 into a tube as the tube is thrust into the coupling body. At the second or inner end 44 of stiffener 34 there is provided a generally radially outward extending flange 46. The dimension of the flange outer peripheral surface 48 is such that the flange is closely slidably received within coupling body cylindrical surface 18. Surface 18 cooperates with flange 46 to center, align and maintain stiffener 34 approximately concentric with the axis of coupling body 12. This relationship is helpful during assembly of the coupling. Also, the length of insert 38 is such that first or outer end 40 thereof protrudes slightly axially outward from coupling body first end 14.

Sealing between the tube and the coupling body is provided by means of "O" ring seal 60,62. As will be noted from FIG. 1, seals 60,62 are positioned along the interior coupling body cylindrical surface 18. The relationship of the "O" ring seals to an associated tube and the coupling body is such that when the tube is inserted into the body, the seals experience a slight compression so that sealing is achieved at the external surface of the tube and at cylindrical surface 18.

A generally annular spacer ring generally designated 66 is disposed esssentially concentric with the axis of coupling body 12 adjacent flange 46. In the preferred embodiment here under discussion, and with reference to FIGS. 1 and 2, this spacer ring is fabricated from polyethylene material and includes a cylindrical portion 68 having an inside diameter greater than the outside diameter of the pipe which is to be inserted into the coupling body. The annular cavity thus defined provides clearance for a subsequently inserted chamfer ring as will be described. Forward end face 70 of the spacer ring is adapted to abut insert flange 46 and the opposite or rear end face 72 is adapted to abut "O" ring seal 60. A radially inward extending rim or shoulder 74 is disposed at rear end face 72 and has a diameter slightly greater than the outside diameter of the associated tube. A plurality of embossed areas 76,78 and 80 extend a short distance axially inward of rim or shoulder 74. Each of these areas includes an innermost or bottom surface 82 which tapers radially inward from rim 74 to an axial inner edge 84 so as to define a ramp-like tube engaging tooth.

The relative diametrical relationships defined at inner edges 84 of embossed areas 76,78 and 80 are less than the outside diameter of a tube to be associated therewith. Tapered bottom surfaces 82 allow the tube to pass therethrough but any attempts at tube withdrawal cause edges 84 to more securely engage the tube and thereby resist such withdrawal. Indeed, attempted withdrawal of the tube from the coupling will cause the seal rings and collet 24 to move as a unit to the right of FIG. 1 to enhance and supplement tube gripping by spacer ring 66 and the collet. The internal area of spacer ring cylindrical portion 68 axially between the forward ends of embossed areas 76,78 and 80 and ring forward end face 70 defines a chamfer ring receiving chamber 86 (FIG. 1) for purposes to be described. Spacer ring 66 functions to both position "O" ring seals 60,62 in the manner shown in FIG. 1 and to provide support for flange 46 of stiffener 34 prior to the entry of a tube into the coupling body.

Positioned on the outboard side of "O" ring seal 62 is a thrust washer 88. This washer functions to aid in positioning the "O" ring seals and to separate the seals from retaining collet 24. Washer 88 prevents movement of seal 62 into the recesses of the collet. Seal 62 is thus captured or fixed in the position generally shown in FIG. 1 so as to be in contact with coupling body surface 18.

Collet 24 is positioned between thrust washer 88 and coupling body first end 14. The collet is provided with a tapered external surface 90 which converges in the direction of the first end 14 and is generally complementary to frustoconical surface 22 defined by back-up ring 20 to bear against surface 22 during such time as a pull-out force is exerted on an associated tube. The interior of the collet is defined by a toothed surface generally designated 92 including inclined ramp surfaces which diverge in the direction of coupling body first end 14. As a result of the dimensional and structural characteristics of teeth 92, any attempt at withdrawal of an associated tube from the coupling body will cause the teeth to bite into the external surface of the tube. It should be appreciated that various other structural arrangements for the teeth may also be advantageously employed.

As described in commonly assigned U.S. Pat. No. 4,229,025, collet 24 is provided with a plurality of generally longitudinally extending recesses. These recesses are staggered such that alternate recesses open toward one end of the collet while corresponding alternate recesses open toward the other collet end. Also, the recesses extend through the entire radial thickness of the collet. The purpose and function of the collet recesses are to permit contraction of the collect at such time as a pull-out force is exerted on the associated tube and the collet is brought into abutting engagement with back-up ring 20 of the coupling body. The application of such a pull-out force to the tube causes the collet to be cammed into back-up ring 20 for causing the collet to be uniformly contracted circumferentially. Use of the recesses provides an advantageous structure for absorbing contractions of the collet without cracking or distortion of the collet material.

In a like manner, the alternately spaced longitudinal recesses permit the collet to expand radially outward. The collet is preferrably manufactured such that the internal dimension of the toothed surface thereof is slightly less than the outer diameter of the associated tube. As a result, an initial interference fit is established between the tube and the collet whereby the collet is expanded slightly during tube insertion into the coupling body. Because of this collet preloading feature, greater initial holding of the collet relative to the tube will be achieved.

It should be appreciated that all of the elements of the coupling with the exception of the back-up ring 20 and elongated stiffener or insert 34 are fabricated from non-metallic materials. In the preferred embodiment, the back-up ring is fabricated from stainless steel which renders it essentially impervious to corrosion. In alternate embodiments the backup ring may be fabricated from plastic or other materials. Alternately, the backup ring may be eliminated altogether. Stiffener 34 may be fabricated from steel, stainless steel or plastic. As a consequence, the coupling construction is non-corrosive in nature and is suitable for use with plastic pipe. It should be appreciated, however, that alternate materials for the several coupling components may be selected including metals and other plastics. Similarly, and while the coupling construction has been described in connection with use for plastic tube or pipe, it should be appreciated that metallic tubes or pipes may be used as well.

In accordance with the subject invention, there is advantageously provided a chamfer ring generally designated 100 in FIGS. 3 and 4. The ring is desirably constructed from a plastic material such as a polyethylene or the like and includes an annular body 102 having a forward face area 104 and a rear face area 106. The diameter of a central passage 108 is such that there is an interference fit between the chamfer ring and the insert 34. This interference fit enables the chamfer ring to be positioned at the end of the insert 34 when the coupling is shipped. A flexible lip 110 extends generally radially inward into and circumferentially around passage 108 at chamfer ring forward face area 104. In its free state, the inside diameter of the lip is slightly less than the outside diameter of insert 34. When the chamfer ring is installed on the insert, lip 110 is flexed and acts to provide a slight retaining force or interference fit while still allowing sliding movement of the chamfer ring axially of insert 34.

Rear face area 106 is generally flat and terminates at an outer diameter 112 which, preferably, is substantially the same as or slightly greater than the outside diameter of the tube which is to be inserted into the coupling. Forward end face area 104 tapers outwardly from adjacent passage 108 toward rear face area outer diameter 112. In the structural arrangement shown, this taper is arcuate or radiused, although other conformations could also be advantageously employed. In the preferred embodiment a thin outer lip or flange 114 extends generally radially outward and axially rearward from the chamfer ring at rear face area outer diameter 112. This lip is desirably very flexible and generally functions to cover the interface between the tube and chamfer ring at rear face area 106 when the tube is being inserted into the coupling. In some cases, however, it may be possible to entirely eliminate outer lip 114 from the chamfer ring or to use other lip and flange-like conformations. Such modifications do not in any way depart from the overall intent and scope of the invention.

Prior to insertion of a tube into the coupling body, and with reference to FIG. 5, chamfer ring 100 is externally inserted on the first or outer end 42 of insert 34 to a position closely adjacent coupling body flange or lip 32. This can be done in the field or, alternately, at the time of manufacture of the coupling. If done at the time of manufacture, the interference fit between the ring and the insert causes the ring to be retained on the insert near the end thereof. A length of hollow tubing 130 having an inner diameter 132 which will receive external surface 38 of insert 34 is inserted onto the insert at first end 40 thereof. Preferably, tube end face 134 will be cut in a manner so as to be generally normal to the tube longitudinal axis. As shown in FIG. 5, tube end face 134 engages chamfer ring rear face area 106 with chamfer ring outer diameter 112 being just slightly greater than the outside diameter of tube 130. In the preferred embodiment lip or flange 114 extends generally rearwardly over the interface between area 106 and face 134.

As the tube is urged further onto elongated insert 34 and into coupling body 12 from first end 14 at passage 30, chamfer ring 100 leads the tube past the internal coupling components. Tapered forward face area 104 first acts to temporarily expand body flange or lip 32 to accommodate ease of passage for the tube with chamfer ring flange 114 being forced rearwardly to cover tube end 134 and prevent any interference between the tube end and body lip 32. Thereafter, and upon further insertion of the tube into the coupling, the chamfer ring similarly acts to lead tube end 130 through collet 24, thrust washer 88, seal rings 62,60 and spacer ring 66, respectively. The chamfer ring particularly permits the tube to slip past the O-rings without distortion, rolling or pinching of the O-rings.

FIG. 6 shows the tube as it has been fully inserted into the coupling body. From this FIGURE, it will be seen that chamfer ring 100 is disposed in spacer ring chamber 86 toward abutting engagement with insert flange 46 and axially forward of the tube engaging teeth defined by edges 84 of embossed areas 76,78 and 80. This then assures that the chamfer ring will not interfere with the desired gripping of the tube by the coupling. That is, tube 130 will be grippingly retained in the coupling body at two axially spaced areas thereof by means of the spacer ring teeth and the collet teeth.

It should be appreciated that with the exception of the insertion of free end 134 of the tube into the coupling body, all assembly operations concerning the coupling are carried out by the coupling manufacturer. When received in the field with the chamfer ring installed at the free end of the insert, the coupling unit requires no further assembly other than to insert the pipe or tubing into the coupling as described above. There is no fusion joint made in the field nor is there any necessity to assembly any of the internal coupling components in the field. This eliminates concern of incorrect assembly oftentimes raised in connection with prior art structures wherein the installer must assemble all the components of the coupling in the field under conditions less than optimum. Also, use of the chamfer ring eliminates the need for performing any tube chamfering operations in the field under less than optimum conditions as has heretofore been required. Such field chamfering necessitated the provision of special chamfering tools.

Alternately, the coupling can be shipped without the chamfer ring in place. In this event, installation of the ring takes place in the field. In the preferred embodiment the chamfer ring is assembled with the coupling by the manufacturer to eliminate the possibility of the ring being omitted at the time of installation.

It should be readily appreciated that the subject invention is applicable to many different types of coupling designs and constructions. For example, several possible modifications are shown and described in the commonly assigned U.S. Pat. No. 4,229,025. Such disclosure is incorporated hereinto by reference and the structures thereof are adaptable to use with the subject invention.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a stab-type coupling for couplingly receiving an end portion of a pipe wherein said coupling includes a body having a first end and an internal recess extending inwardly from said first end adapted to receive the pipe end portion, an elongated hollow insert disposed within said recess and about which the pipe end portion is adapted to be received, and at least a pipe gripping member disposed within said recess surrounding a portion of said insert in a radially spaced relationship with said gripping member including pipe gripping means disposed on the inner surface thereof adapted to retainingly engage a pipe end portion inserted axially therepast into said coupling body recess, the improvement comprising:

a chamfer ring receivable through a central passage therein onto the exterior of said elongated insert adjacent said coupling body first end, said chamfer ring being retainingly received on said insert against accidental displacement therefrom during handling of said coupling while being axially movable therealong under the influence of an axial force applied thereto, said chamfer ring including a forward end area facing said first end and a rear end area adapted to be engaged by the end face of a pipe, said forward end area having an outer diameter at least generally as large as the outside diameter of a pipe which is to be inserted into said coupling, whereby as the end portion of a pipe is urged axially along said elongated insert and into said coupling body recess from said body first end said chamfer ring will be urged along said insert ahead of the pipe end portion in order that the chamfer ring forward end area will act as a pipe end portion lead through the gripping member means to facilitate ease of pipe end portion insertion into said coupling.

2. The improvement as defined in claim 1 wherein said chamfer ring includes a resilient lip for engaging said insert.

3. The improvement as defined in claim 1 wherein said chamfer ring forward end area tapers generally outwardly over the axial extent thereof from said central passage toward said rear end area outer diameter.

4. The improvement as defined in claim 3 wherein the taper of said forward end area is generally arcuate in conformation.

5. The improvement as defined in claim 1 wherein a generally outwardly extending flexible lip-like member surrounds said chamfer ring at generally said rear end area outer diameter, said lip-like member extending outwardly both axially and radially from said rear end area outer diameter, said lip-like member adapted to be flexed rearwardly in a manner covering the outside of the annular interface between said chamfer ring rear end area and the terminal end of a pipe end portion as the end portion is inserted into said coupling body.

6. The improvement as defined in claim 1 wherein said coupling body further includes a protective flange encircling the entrance area of said coupling body recess at said body first end adapted to closely embrace a pipe received in said coupling body recess, said chamfer ring adapted to cause slight radial expansion of said protective flange as it is passed therethrough in response to the urging of a pipe end portion to thereby accommodate ease of passage of the pipe end portion through said protective flange.

7. A stab-like coupling for connecting an end portion of a smooth walled pipe to a fitting or another pipe, said coupling comprising in combination:

a non-metallic coupling body having a first end and an internal recess adapted to receive the end portion of a smooth walled pipe;

a generally elongated and hollow metallic insert disposed within said recess and about which the end portion of a smooth walled pipe is adapted to be received;
at least one elastomeric seal ring disposed within said recess adapted to sealingly engage the end portion of a smooth walled pipe and said coupling body when said pipe is disposed within said seal ring;
a non-metallic retaining collet disposed within said recess, said collet having a tapered external surface which converges in the direction of said coupling body first end and a toothed internal surface adapted to engage the end portion of a smooth walled pipe;
a generally frusto-conical metallic backup ring retained by said coupling body, said backup ring having an internal surface generally complementary to said collet external surface and against which said collet is adapted to bear in the event of an attempted withdrawal of the smooth walled pipe from said coupling body; and,
a non-metallic chamfer ring closely receivable through a central passage therein onto said elongated hollow insert adjacent said coupling body first end in retaining relationship to said insert for preventing accidental displacement of said chamfer ring from said insert during handling of said coupling while providing axial movement thereof along said insert responsive to an axial force applied thereto, said chamfer ring including a forward end area adapted to face said coupling body first end and a rear end area adapted to be engaged by an end portion end face of a smooth walled pipe, said forward end area having a portion thereof tapering toward said rear end area adjacent the outer diameter thereof with said rear end area having an outer diameter at least generally as large as the outside diameter of the end portion of a smooth walled pipe which is to be inserted into said coupling, whereby as the end portion of a smooth walled pipe is urged axially along said elongated insert and into said coupling body recess from said body first end, said chamfer ring will be urged along said insert in advance of the pipe end portion in order that the tapering portion of said chamfer ring forward end area will act as a pipe end portion lead to facilitate ease of insertion thereof into said coupling.

8. The coupling as defined in claim 7 wherein said chamfer ring includes a resilient lip for engaging said insert.

9. The coupling as defined in claim 7 wherein said chamfer ring forward end area tapers generally outwardly over the axial extent thereof from said central passage toward said rear end area outer diameter.

10. The coupling as defined in claim 7 wherein a flexible lip-like member extending outwardly both axially and radially surrounds said chamfer ring at generally said rear end area outer diameter, said lip-like member adapted to be flexed rearwardly in a manner covering the outside of the annular interface between said chamfer ring rear end area and the terminal end of a smooth walled pipe end portion as the end portion is inserted into said coupling body.

11. The coupling as defined in claim 7 wherein said coupling body further includes a generally annular dirt and moisture cover surrounding said recess at said body first end adapted to closely embrace a smooth walled pipe disposed within said body, said chamfer ring adapted to cause a slight radial expansion of said cover as it is passed therethrough in response to the urging of a pipe end portion to thereby accommodate ease of passage of the pipe end portion through said cover and through said retaining collet and seal ring.

12. A method for providing ease of insertion of a pipe end portion into a stab-type coupling wherein said coupling includes a coupling body having a recess extending thereinto from a coupling body first end, an elongated hollow insert generally coaxially disposed in and extending longitudinally of said recess and at least pipe gripping means and sealing means encircling said insert in said recess adapted to retainingly engage and seal a pipe end portion inserted therethrough, said method comprising the steps of:
(a) providing a chamfer ring receivable on said elongated hollow insert through a chamfer ring central passage, said chamfer ring being configured to have a forward end area and a rear end area with the outer diameter of the rear end area being at least generally as large as the outside diameter of a pipe end portion to be inserted into said coupliing said with at least a portion of said forward end area tapering toward said rear end area adjacent the outer diameter thereof;
(b) placing said chamfer ring on said elongated insert with said forward end area facing said coupling body first end;
(c) installing a pipe end portion on said elongated insert and moving said end portion axially along said insert until the terminal end face of the pipe end portion engages said chamfer ring rear end area; and,
(d) urging the pipe end portion axially into said coupling recess with said chamfer ring acting as a pipe end portion lead for accommodating ease of pipe insertion into said recess through at least said gripping means and said sealing means.

13. The method as defined in claim 12 wherein said step of placing said chamfer ring on said insert is carried out by placing said chamfer ring in resilient gripping relationship onto said insert for preventing accidental displacement therefrom from said insert during handling of said coupling while providing axial movement thereof along said insert responsive to an axial force applied thereto.

14. A stab-type coupling for couplingly receiving an end portion of a pipe comprising:
a body having a first end and an internal recess extending inwardly from said first end adapted to receive a pipe end portion;
an elongated hollow insert disposed within said recess and about which a pipe end portion is adapted to be received;
a pipe gripping member disposed within said recess surrounding a portion of said insert in a radially spaced relationship, said gripping member including pipe gripping means disposed on the inner surface thereof adapted to retainingly engage a pipe end portion inserted axially there past into said coupling body recess;
a chamfer ring receivable through a central passage therein onto the exterior of said elongated insert adjacent said coupling body first end, said chamfer ring including a forward end area facing said first end and a rear end area adapted to be engaged by the end face of a pipe, said forward end area having an outer diameter at least generally as large as the outside diameter of a pipe which is to be inserted into said coupling, whereby as the end portion of a pipe is urged axially along said elongated insert and into said coupling body recess from said body first end said chamfer ring will be urged along said insert ahead of the pipe end portion in order that the chamfer ring forward end area will act as a pipe end portion lead through the gripping member means to facilitate ease of pipe end portion insertion into said coupling;

a spacer ring located in said coupling body recess, said spacer ring including a cylindrical body disposed in a radially spaced encircling relationship with an axial portion of said insert, said spacer ring having a first end disposed adjacent the innermost end of said insert and a second end spaced from said first end axially along said insert; and, said second end of said spacer ring including pipe engaging means generally associated therewith and the inside diameter of said cylindrical body being greater than the diameter of said chamfer ring rear end area outer diameter for defining a chamfer ring receiving chamber, whereby said chamber is adapted to receive said chamfer ring when a pipe end portion is installed on said elongated insert and urged into said coupling body recess toward said insert innermost end for preventing interference to an engaging relationship between said spacer ring engaging means and the pipe end portion.

15. A stab-like coupling for connecting an end portion of a smooth walled pipe to a fitting or another pipe, said coupling comprising in combination:

a non-metallic coupling body having a first end and an internal recess adapted to receive the end portion of a smooth walled pipe;

a generally elongated and hollow metallic insert disposed within said recess and about which the end portion of a smooth walled pipe is adapted to be received;

at least one elastomeric seal ring disposed within said recess adapted to sealingly engage the end portion of a smooth walled pipe and said coupling body when said pipe is disposed within said seal ring;

a non-metallic retaining collet disposed within said recess, said collect having a tapered external surface which converges in the direction of said coupling body first end and a toothed internal surface adapted to engage the end portion of a smooth walled pipe;

a generally frusto-conical metallic backup ring retained by said coupling body, said backup ring having an internal surface generally complementary to said collet external surface and against which said collet is adapted to bear in the event of an attempted withdrawal of the smooth walled pipe from said coupling body;

a non-metallic chamfer ring receivable through a central passage therein onto said elongated hollow insert adjacent said coupling body first end, said chamfer ring including a forward end area adapted to face said coupling body first end and a rear end area adapted to be engaged by an end portion end face of a smooth walled pipe, said forward end area having a portion thereof tapering toward said rear end area adjacent the outer diameter thereof with said rear end area having an outer diameter at least generally as large as the outside diameter of the end portion of a smooth walled pipe which is to be inserted into said coupling, whereby as the end portion of a smooth walled pipe is urged axially along said elongated insert and into said coupling body recess from said body first end, said chamfer ring will be urged along said insert in advance of the pipe end portion in order that the tapering portion of said chamfer ring forward end area will act as a pipe end portion lead to facilitate ease of insertion thereof into said coupling; and, a non-metallic spacer ring in said coupling body recess, said spacer ring including a cylindrical body disposed in a radially spaced encircling relationsip with an axial portion of said insert, said spacer ring having a first end disposed adjacent the innermost end of said insert and a spacer ring second end spaced adjacent said seal ring, said second end including pipe gripping means generally associated therewith and the inside diameter of said cylindrical body being greater than said chamfer ring rear end area outer diameter for defining a chamfer ring receiving chamber adapted to receive said chamfer ring and prevent gripping interference between said spacer ring gripping means and the end portion of a smooth walled pipe when the pipe end portion is substantially fully inserted into said coupling recess.

16. A chamfer ring for leading a pipe end portion into a coupling recess over a hollow insert comprising: a ring member including an external forward area and a rear end area and a generally cylindrical central passage therethrough, said rear end area having a rear end area outer diameter, said forward area sloping outwardly toward said rear end area, a flexible lip-like member extending outwardly both axially and radially from said rear end area at said rear end area outer diameter, and a resilient lip extending inwardly of said central passage for resiliently gripping the insert.

17. The chamfer ring as defined in claim 16 wherein said resilient lip extends inwardly of said passage at the end of said ring member opposite from said rear end area thereof.

18. A stab-type coupling including a body having a recess surrounding a tubular insert, said body having a first end from which said insert projects, means in said recess for externally engaging a pipe received therein over said insert, a chamfer ring receivable over said insert in resilient gripping relationship therewith for preventing accidental displacement thereof from said insert while providing axial movement thereof along said insert responsive to axial force applied thereto, said chamfer ring having an outwardly tapering external forward end area for leading a pipe end portion past said means for externally engaging a pipe, said chamber ring having a rear end area engageable by a pipe end receivable over said insert for reception in said recess to lead such pipe end past said means for externally engaging the pipe, and said chamfer ring having an external diameter adjacent said rear end area thereof which is at least approximately as great as the external diameter of the pipe.

19. The coupling as defined in claim 18 wherein said chamfer ring includes a flexible lip-like member extending outwardly both axially and radially from said rear end area thereof for overlying the intersection between said rear end area and a pipe end portion engaging same.

20. The coupling as defined in claim 19 including an inwardly exgending resilient lip on said chamfer ring for resiliently engaging said insert.

21. The coupling as defined in claim 18 including a spacer ring in said recess and having a chamfer ring receiving chamber for receiving said chamfer ring upon movement thereof into said chamber under influence of a pushing force applied to said chamfer ring by a pipe end portion.

* * * * *

UNITED STATES PATENT AND TRADEMARK OFFICE
CERTIFICATE OF CORRECTION

PATENT NO. : 4,407,526
DATED : October 4, 1983
INVENTOR(S) : Christopher W. Cicenas It is certified that error appears in the above-identified patent and that said Letters Patent is hereby corrected as shown below:

The title of the invention should read
-- Stab-Type Coupling and Method --.

*Signed and Sealed this*

*Third* Day of *January 1984*

[SEAL]

*Attest:*

GERALD J. MOSSINGHOFF

*Attesting Officer*     *Commissioner of Patents and Trademarks*